x

US006999863B2

(12) United States Patent
Neal et al.

(10) Patent No.: US 6,999,863 B2
(45) Date of Patent: Feb. 14, 2006

(54) VARIATION MANAGER FOR CRASH SENSING ALGORITHMS

(75) Inventors: Mark O. Neal, Rochester, MI (US); Dorel M. Sala, Troy, MI (US); Jenne-Tai Wang, Troy, MI (US); Chin-Hsu Lin, Troy, MI (US); Jian Tu, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/336,994

(22) Filed: Jan. 6, 2003

(65) Prior Publication Data

US 2004/0133325 A1 Jul. 8, 2004

(51) Int. Cl.
*B60R 22/00* (2006.01)
(52) U.S. Cl. ....................................................... 701/46
(58) Field of Classification Search ................. 701/45, 701/46, 47; 280/728.2, 733–735, 801.1, 280/802, 803, 805, 806, 748, 749
See application file for complete search history.

(56) References Cited

U.S. PATENT DOCUMENTS

| 5,337,260 | A | * | 8/1994 | Spangler ....................... 702/88 |
| 5,608,629 | A | | 3/1997 | Cuddihy et al. |
| 6,219,606 | B1 | * | 4/2001 | Wessels et al. ................ 701/45 |
| 6,609,053 | B1 | * | 8/2003 | Breed ........................... 701/45 |
| 6,615,660 | B1 | * | 9/2003 | Feinberg et al. ........... 73/382 R |
| 2002/0105428 | A1 | * | 8/2002 | Benson et al. ............... 340/635 |
| 2002/0169553 | A1 | * | 11/2002 | Perlmutter et al. .......... 701/214 |
| 2003/0069678 | A1 | * | 4/2003 | Ota .............................. 701/45 |

* cited by examiner

*Primary Examiner*—Thu V. Nguyen
(74) *Attorney, Agent, or Firm*—Kathryn A. Marra

(57) ABSTRACT

A method is disclosed for managing variation in acceleration values obtained from a vehicle acceleration sensor for use in on-board computer based crash evaluation algorithm. Sources contributing to the variation are identified and a determination is made of the magnitude of the variation from each source to a selected multiple of a standard deviation, for example, 3 to 6 σ. The variation for each source is suitably combined to produce a database of acceleration-time history with the combined variations for use in calibrating and or validating a candidate crash algorithm.

11 Claims, 6 Drawing Sheets

VARIATION MANAGER FOR CRASH SENSING ALGORITHMS

TECHNICAL FIELD

This invention pertains to vehicle crash sensing data and to algorithms for analyzing the data. More specifically this invention pertains to a process for analyzing and managing the magnitude and character of random variation that occurs in the stream of acceleration signals from vehicle sensors during a crash event.

BACKGROUND OF THE INVENTION

Current automobiles typically contain supplemental inflatable restraints (air bags) located in the passenger compartment for occupant protection in the event of a crash. These vehicles also contain one or more accelerometers affixed to the vehicle body in locations at which it is desired to detect a crash impact. One or two such sensors may be located at the front of the vehicle on the radiator cross bar for early detection of front end impacts. Another acceleration sensor may be located in the passenger compartment, e.g., under a front seat. These sensors typically transmit a continuous stream of voltage signals to a crash detector control module. The control module is programed with a suitable algorithm(s) to receive the acceleration signals and to filter, store and analyze them to determine whether an impact is occurring requiring inflation of a restraint. The detection of an impact and activation of an airbag or other passenger protection device usually has to be accomplished within a tenth of a second after the initial impact.

The acceleration sensors are presently incorporated into a suitable printed circuit board for production and transmittal of the acceleration signals. The boards are oriented and mounted so that the direction of the impact force is known. Under normal vehicle operation the accelerometers experience no unusual acceleration and the control module simply cycles their baseline inputs through a data receiving and discarding mode of operation. However, the voltage outputs of each acceleration sensor contain appreciable variation from a plurality of sources and the control module must be capable of dealing with such variation in its crash analysis task.

It is an object of this invention to provide a method for the management of variations from multiple sources in acceleration sensor output. More specifically, it is an object of this invention to provide a process that will serve as a variation management tool for the calibration and validation of crash detection algorithms using accelerometer data.

SUMMARY OF THE INVENTION

This invention is a process to be executed on a computer for managing variation in acceleration signals obtained from accelerometers mounted on the vehicle body. As stated, acceleration values are often used in crash sensing algorithms to determine whether to command inflation of an airbag or activation of another passenger restraint device. It is important both in the conduct of the crash sensing process and in evaluation of the process to account for the variations in the acceleration signals.

Initially, sources of acceleration signal variations are identified and their magnitudes estimated or quantified. These sources include, for example, the front structure of the vehicle and the vehicle mounting structure for the acceleration sensor. Signal variations may arise from the flexibility and alignment of the printed circuit board on which the sensor is mounted. Also, the accelerometer has a sensitivity that affects its signal, and its "zero" reading may be offset. There may be variability in the reading of its clock. And there can be variability attributable to the mathematical processing of the acceleration signal. These and other sources are identified, evaluated and quantified, if practical.

The next step of the acceleration variation management process is to determine a reliability requirement for the sensing algorithm. If variation in each case can be treated as part of a known or estimated standard deviation, denoted by $\sigma$, the subject process creates an envelope of, for example, $3\sigma$, $4\sigma$ or $6\sigma$ variation values for each variation source depending upon the specified reliability of the proposed algorithm. Thus, $6\sigma$ variation values, for example, for each selected type of variation source for each accelerometer is then determined.

The effects of all of the different types of acceleration variation sources are combined for each acceleration sensor to give a single acceleration signal that includes an estimate of the total variation at the desired level of reliability, i.e., $3\sigma$, $6\sigma$, etc. In accordance with this invention this is a multi-step process.

First, an acceleration-time history database or plot is obtained for different modes of actual or simulated vehicle crash events. For example, acceleration-time data is obtained for a thirty mile-per-hour (mph) crash of a representative vehicle into a rigid barrier angled at 30 degrees to a head on collision. The accelerometer voltage values are converted to values of g (the standard acceleration due to gravity). The detected values of acceleration for the sensor location over the critical duration of the crash, for example, over a period of 250 milliseconds following initial impact, are recorded and stored in computer memory. The computer then reads the variation value for the first variation type to be applied for a given level of reliability, say $6\sigma$. An equation relating the variation value for the first variation type to the acceleration time history is used to produce an acceleration variation-time history for this first variation type. In the same way an acceleration variation-time history vector is obtained for each separate variation source, although the equation used for each variation type may be different.

Each of the acceleration variation-time history vectors for the respective variation sources is then mathematically integrated to obtain corresponding velocity variation-time history vectors. The velocity variation-time history vectors representing each variation source are then combined to get the total variation (from all sources) velocity-time history vector for the acceleration sensor in the crash event. The resulting total variation velocity-time history vector is differentiated to produce the total acceleration variation-time history vector. The acceleration variation-time history vector is added to the original acceleration-time history vector to get the acceleration-time history vector with the desired level of reliability (in this example, $6\sigma$). The process is repeated for each crash sensing accelerometer on the vehicle. It is also repeated for each crash mode under consideration.

Such acceleration-time history vectors with the specified variation are used in calibration of a proposed crash sensing algorithm. Crash sensing algorithms normally set certain acceleration, velocity or displacement threshold values at each sensor location in accessing a crash event. The velocity values at each time increment in the crash event are obtained by integration of corresponding acceleration values, and displacement values are obtained by integration of corresponding velocity values. Accordingly, it is important to know the possible variation in the acceleration values which are the basic data used by the crash algorithm. These acceleration-time history vectors with variation provide estimates of the maximum variation that could be expected for a given level of reliability. Calibration of the sensing algorithm so that it performs correctly with these acceleration-time history vectors provides some level of confidence that the algorithm will perform correctly at the desired level of reliability. The process of this invention provides a useful tool for managing the variation inherent in the several sources affecting the signal from a particular accelerometer.

This invention also provides a process for using the analysis of the identified variation sources in assessing the validity of a proposed crash sensing algorithm. In this validation aspect of the invention, the computer reads the standard deviation value, $\sigma$, for each of the variation sources. A large, normally distributed population of variation values is then generated for each variation source that would be expected to have a normal distribution of variation. For variation sources that would be expected to have a more uniform distribution of variation, a uniform distribution is created with variation values between the lower and upper bounds input by the user. For example, several hundred thousand to a million variation values are created and applied as follows.

One variation value is randomly selected from this large population for each variation source, and, for each variation source the acceleration-time history variation is determined based only on the variation value selected for that source. The acceleration-time history variation from all sources are then combined by vector addition with the original acceleration-time history to obtain an acceleration-time history with random variation. This process is repeated until all values from the variation source populations have been selected and combined to form a large population of acceleration-time history curves with random variation. This large population of acceleration-time histories with random variation are then tested in the proposed crash algorithm. If the algorithm produces the desired results, test after test, confidence is gained in its validity for the actual sensors and vehicle combination. Significant numbers of failures during this systematic testing of the algorithm with acceleration values including random variation indicates that the algorithm calibration may need adjustment.

Thus, the systematic analysis and evaluation of variation sources in the output of vehicle acceleration sensors in accordance with this invention enables the calibration and validation of proposed crash sensing algorithms using such acceleration data. These calibration and validation processes would generally be used in the development of a candidate crash sensing algorithm for a vehicle.

Other objects and advantages of the invention will become more apparent from a detailed description of preferred embodiments which follows.

BRIEF DESCRIPTION OF THE DRAWINGS

FIG. 2a shows both the nominal accelerometer data with time as well as the accelerometer data with $-6\sigma$ and $+6\sigma$ variations.

FIG. 2b is a graph of velocity signals (mph), both nominal and with $-6\sigma$ and $+6\sigma$ variations, with time corresponding to the acceleration signals of FIG. 2a.

DESCRIPTION OF THE PREFERRED EMBODIMENT

The present invention is directed to a computer tool that serves as an acceleration variation manager in the development of vehicle crash sensing algorithms. This variation manager is useful as an integral part of a crash sensing algorithm calibration and validation process. The variation manager approximates the variation of acceleration signals measured on the vehicle during crash events. These signals are measured by accelerometers at various locations on the vehicle and are used in sensing algorithms, which determine if the crash event requires deployment of an occupant protection device. When developing a sensing algorithm it is important to know the magnitude and character of the random variation that may occur in the acceleration signals from a crash event, so that the sensing algorithm can be designed to accommodate, or be insensitive to, such random variations.

The functionality of the variation manager will be described in detail below in connection with its use in calibration of a proposed crash sensing algorithm and/or validation of a crash sensing algorithm. In each instance acceleration signals from actual crash tests or simulated crash tests are stored in a computer database. Typically the acceleration-time data covers a representative range of crash scenarios. Also stored in the database are acceleration signal variation data based on information from sensor manufacturers, vehicle experience, or other sources of variation information. A specification of the variation requirements or limitations of the acceleration data for use in the algorithm are also incorporated in the database.

Figure 1A:
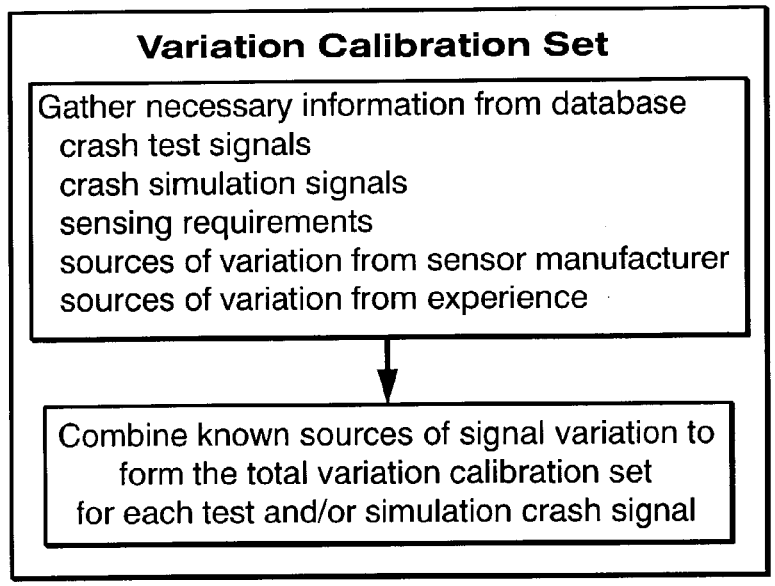
FIG. 1a is a flow chart illustrating the application of the computer executed variation management process of this invention in preparing a variation calibration set of accelerometer signals for the calibration of vehicle crash sensing algorithms. This chart identifies information that is gathered from a database for use in the process; including sources of acceleration signals, sensing requirements for a proposed algorithm and sources of acceleration signal variation. The known and useful sources of signal variation are then combined to form a total variation calibration set for each acceleration signal.

In calibrating a crash sensing algorithm, accelerometer crash signals from actual tests or crash simulations are combined with signal variation information to form a variation calibration data set for each test and/or simulation crash acceleration signal as summarized in FIG. 1a. This variation calibration set is then used to calibrate a proposed crash algorithm, i.e., to set threshold acceleration or velocity or displacement values for use in the algorithm.

Figure 1B:
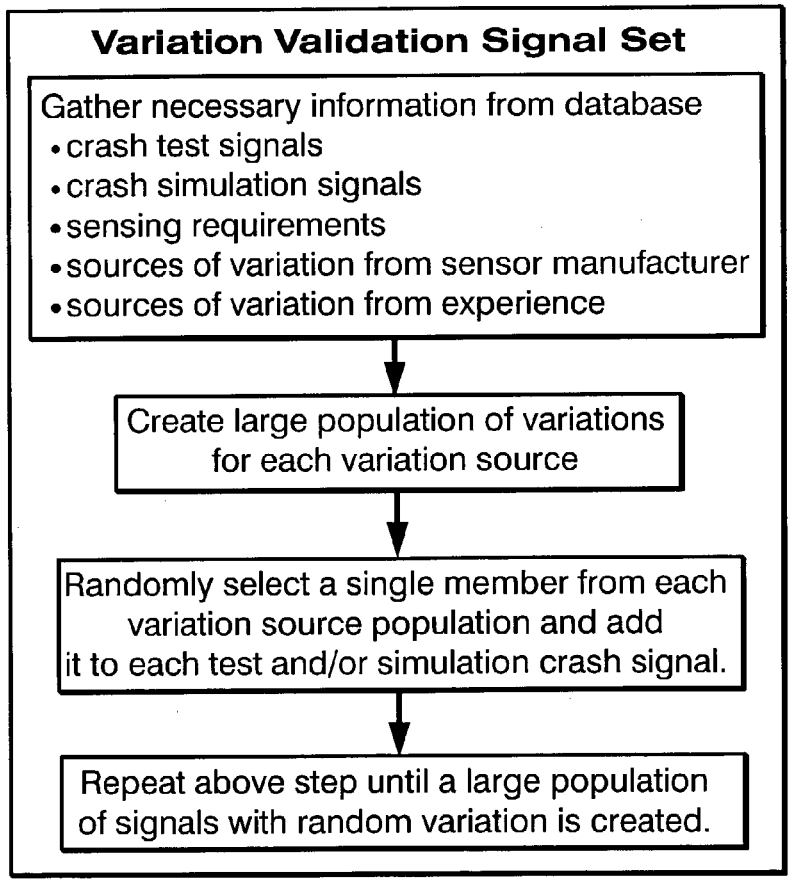
FIG. 1b is a flow chart illustrating the application of the variation management process of this invention in preparing a set of acceleration variation signals for the validation of vehicle crash sensing algorithms. As in FIG. 1a, crash signals, sensing requirements and variation sources are gathered from a prepared database. A large population of acceleration signal variations are created for each acceleration signal variation source. A single member from each variation source population is selected and added to each acceleration signal for testing in a proposed crash sensing algorithm. This process is repeated until a large population of acceleration signals with random variation have been created and tested in validation of the algorithm.

In validating a proposed crash sensing algorithm, crash signals and signal variation information is likewise used from the database. As summarized in FIG. 1b a large population of variation values are prepared for each identified variation source for each accelerometer. A single member from each variation source population is selected and added to the test or simulated accelerometer crash signal. This process is systematically repeated until a large population of acceleration signals with random variation is created. Each acceleration-with-variation signal set is then systematically tested in a proposed crash algorithm to validate it, i.e., to demonstrate its effectiveness.

The practice of this variation manager process is now further illustrated.

The first step in this process is the generation of a concept for a sensing algorithm, which is then implemented into a mathematical model of the algorithm. The variation manager is then exercised as shown in the lower box of FIG. 1a, and the result is an acceleration variation envelope for each crash event. These acceleration variation envelopes would be the acceleration curves with, for example, $-4\sigma$ and $+4\sigma$ variation included. These crash event variation envelopes are then used to set the thresholds for the sensing algorithm in a process called algorithm calibration.

There are many sources of variation of the acceleration signals that are measured on the vehicle during a crash event. Tables 1a–1d, which are inserted and described below, list and describe several such variation sources. For a given vehicle in a given crash event each of these variation sources may contribute in different degrees to the overall variation of the acceleration signals that are recorded. For example, one source of variation is the sensitivity of the accelerometer (item 2.4 in Table 1b) which may vary due to manufacturing variability, aging of the accelerometer, the ambient temperature at the time of the crash, and other factors. This sensitivity variation is assumed to be part of a normal distribution with a known standard deviation, $\sigma$, given by the manufacturer of the accelerometer. If, for example, a proposed sensing algorithm is intended to work correctly in 99.9999998% of all crash events, then it must be designed to work even if the accelerometer sensitivity varies by as much as $6\sigma$ (note that 99.9999998% of a normal data population falls within $6\sigma$ variation). However, the accelerometer sensitivity variation is only one of a number of variations that affect the acceleration signals used by the sensing algorithm. The first function of a variation manager is to create an envelope of "$-6\sigma$" and "$+6\sigma$" acceleration signals (or any sigma level chosen by the user) for an acceleration sensor in a given crash event that aggregate the effects of all known sources of variation in the acceleration signal.

Figure 2A:
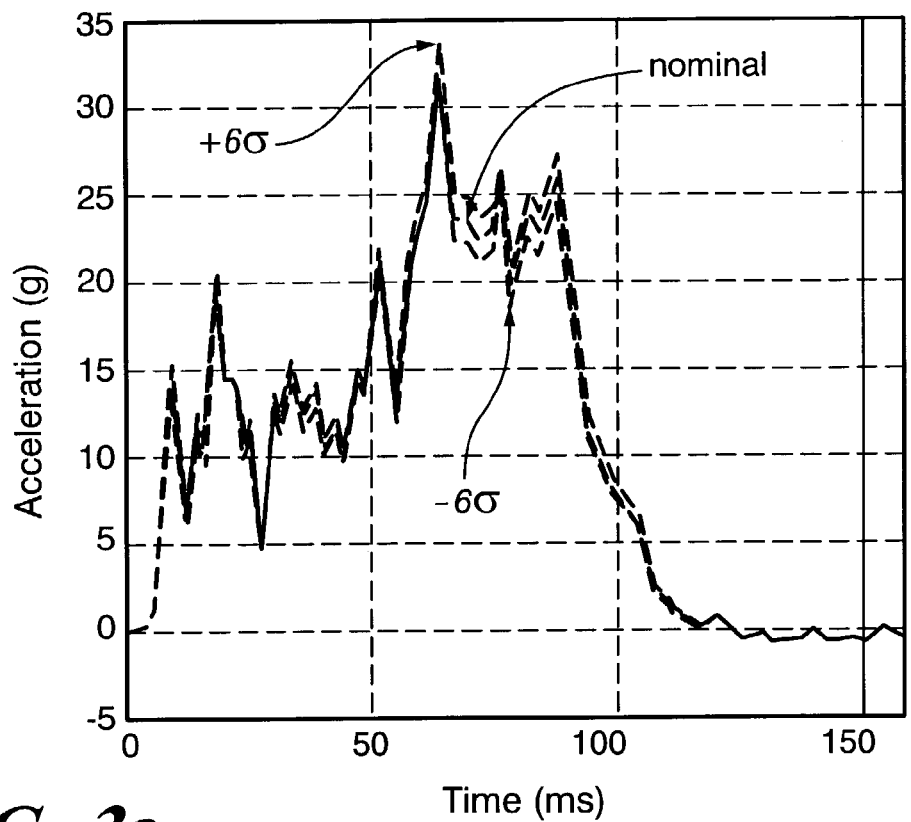
FIG. 2a is a graph of acceleration values (g) with time (milliseconds, ms) obtained from the passenger compartment accelerometer on a test vehicle in a 30 mph crash into a rigid barrier angled at 30 degrees form the longitudinal axis of the vehicle.
Figure 2B:
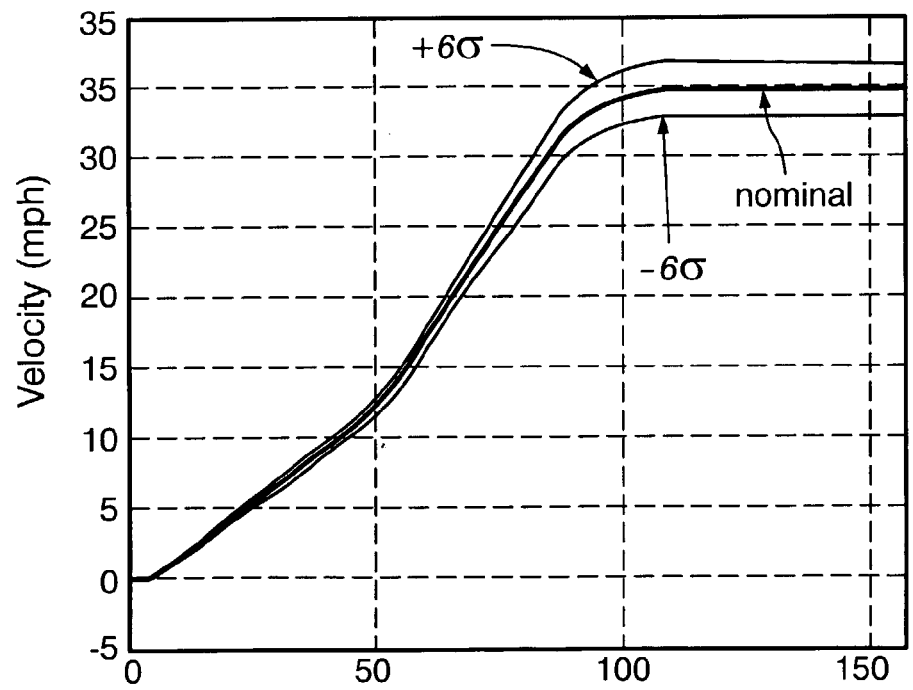

In FIG. 2a, the acceleration signal ("nominal" signal curve over 150 ms of crash duration in the figure) from a 30 mile-per-hour crash of a vehicle into a rigid wall angled at 30 degrees to the longitudinal axis of the vehicle is shown. Also shown are the "$-6\sigma$" and "$+6\sigma$" total variation signals, with time, that have been calculated by the variation manager. (All the acceleration signals shown in FIG. 2a have been filtered at 200 Hz for display purposes.) In FIG. 2b the velocity curve corresponding to the acceleration curve of FIG. 2a is shown so that the curve variation can be seen more easily. The velocity curves are produced by integration of the corresponding acceleration curves with time. If the sensing algorithm performs correctly for these "$6\sigma$" events, there is some measure of assurance that the sensing algorithm will work correctly for this type of crash event about 99.9999998% of the time. Of course, any attempt to assess the probability of correct performance to such a high degree is unlikely to be successful. The example of $6\sigma$ has been used so that the variations in signals can be more easily seen in the figures. In reality, a more realistic variation of $3\sigma$ or $4\sigma$ would probably be selected by the user, which corresponds to 99.73% and 99.9937% probability, respectively.

Identifying Variation Sources

The first task in practicing the variation management process is to identify and evaluate sources of variation in the signal of a given accelerometer. Each accelerometer is typically a small electromechanical device made on a silicon chip and mounted on a printed circuit board (pcb). One or more such sensors are mounted at the front of the vehicle on a structural member such as the radiator tie bar. Another sensor is typically mounted in the passenger compartment under a front seat, for example. This passenger compartment sensor is often part of a sensing and diagnostic module (SDM). Tables 1a–1d illustrate acceleration variations attributable, for example, to the vehicle (1a), to the respective SDM (1b) and front sensors (1c), and to the processing of the acceleration signals (1d).

TABLE 1a

| # | Variation Type | $6\sigma$ variation | $6\sigma$ acceleration variation | Comments |
|---|---|---|---|---|
| Vehicle variation | | | | |
| 1.1 | Sensor mounting structure flexibility (SDM) | $6\sigma_{1.1} = 0.4\%$ @ 400 Hz | See Remark #1 | Assuming 1$^{st}$ resonant frequency is well above accelerometer cutoff frequency. |

TABLE 1a-continued

| # | Variation Type | 6σ variation | 6σ acceleration variation | Comments |
|---|---|---|---|---|
| 1.2 | Sensor mounting structure flexibility (front) | $6\sigma_{1.2} = 2\text{--}5\%$ | $(6\sigma_{1.2})a_x(t)$ | Assuming 1st resonant frequency is well above accelerometer cutoff frequency. |

Remark #1: In order to attach the SDM to the vehicle, it is first attached to a bracket, which is then spot welded to the vehicle. Therefore, the vehicle acceleration signal must pass through this bracket before being measured by the accelerometer in the SDM. Finite element studies have been conducted that indicate an attenuation of an acceleration signal by as much as 0.4% at 400 Hz can be caused by a 6 σ variation in the thickness of this bracket. The effect at lower frequencies drops off linearly until it is very close to zero at 0 Hz. In order to calculate the acceleration variation due to the variation in this mounting bracket, the acceleration data is transformed from the time domain to the frequency domain, each frequency component is multiplied by the attenuation factor for that frequency, and then the resulting signal is transformed back to the time domain.

TABLE 1b

| # | Variation Type | 6σ variation | 6σ acceleration variation | Comments |
|---|---|---|---|---|
| | SDM sensor variation | | | |
| 2.1 | Casing/pcb flexibility | Negligible, second order effect | Negligible, second order effect. See Remark #2 | Assuming 1st resonant frequency is well above accelerometer cutoff frequency. |
| 2.2 | Pcb misalignment (vs. vehicle) | $6\sigma_{2.2} = 0.087$ radians | $(6\sigma_{2.2})a_y(t)- [1-\cos(6\sigma_{2.2})]a_x(t)$ | The second term is not a linear function of the variation source but it is included in calibration set calculation because its exclusion would result in larger error. |
| 2.3 | Accelerometer misalignment (vs. Pcb) | $6\sigma_{2.3} = 0.087$ radians | $(6\sigma_{2.3})a_y(t)- [1-\cos(6\sigma_{2.3})]a_x(t)$ | The second term is not a linear function of the variation source but it is included in calibration set calculation because its exclusion would result in larger error. |
| 2.4 | Accelerometer sensitivity | $6\sigma_{2.4} = 8\%$ | $(6\sigma_{2.4})a_x(t)$ | |
| 2.5 | Accelerometer zero offset | $6\sigma_{2.5} = 11$ mV $= 0.2$ G | $6\sigma_{2.5}$ | |
| 2.6 | Clock variability | $6\sigma_{2.6} < 0.1\%$ | Not a linear function of $\sigma_{2.6}$. See Remark #3 | Not included in calibration set calculation but included in validation set generation |

Remark #2: When the printed circuit board is manufactured, there can be a variability in the its structural flexibility. However, this flexibility results in a movement of the accelerometer in the vertical direction, so the variability in the flexibility will mostly affect the vertical component of the accelerometer and have very little effect on the longitudinal acceleration that is reported.

TABLE 1c

| # | Variation Type | 6σ variation | 6σ acceleration variation | Comments |
|---|---|---|---|---|
| | | Front sensor variation | | |
| 3.1 | Casing/pcb flexibility | Negligible, second order | Negligible, second order | Assuming 1st resonant frequency is well above |

TABLE 1c-continued

| # | Variation Type | 6σ variation | 6σ acceleration variation | Comments |
|---|---|---|---|---|
| | | effect | effect. See Remark #2 | accelerometer cutoff frequency. |
| 3.2 | Pcb misalignment (vs. vehicle) | $6\sigma_{3.2} = 5$ degrees | $(6\sigma_{3.2})a_y(t)- [1-\cos(6\sigma_{3.2})]a_x(t)$ | The second term is not a linear function of the variation source but it is included in calibration set calculation because its exclusion would result in larger error. |
| 3.3 | Accelerometer misalignment (vs. Pcb) | $6\sigma_{3.3} = 5$ degrees | $(6\sigma_{3.3})a_y(t)- [1-\cos(6\sigma_{3.3})]a_x(t)$ | The second term is not a linear function of the variation source but it is included in calibration set calculation because its exclusion would result in larger error. |
| 3.4 | Accelerometer sensitivity | $6\sigma_{3.4} = 10\%$ | $(6\sigma_{3.4})a_x(t)$ | |
| 3.5 | Accelerometer zero offset | $6\sigma_{3.5} = 11$ mV = 0.2 G $6\sigma_{3.5}$ | | |
| 3.6 | Clock variability | $6\sigma_{3.6} = 2\%$ | Not a linear function of $\sigma_{3.6}$. See Remark #3 | Not included in calibration set calculation but included in validation set generation |

Remark #3: As part of the sensing algorithm the acceleration signal must be sampled at even intervals of time. The circuitry in the SDM sensor must have a feature that acts as a clock so that these samples will be taken at precisely the right time. There is some variation in the behavior of these clocks so that the time intervals between samples are not precisely the value that is requested by the sensing algorithm. The resulting acceleration variation is quite random and for this reason its effect is not included in the calibration set calculation. However, during the validation set calculation it is quite simple to include this clock variation. A random value of the clock variation is generated and then this value is used to sample the acceleration signal. The difference between the resulting acceleration signal and the original acceleration signal is the variation of the acceleration due to that particular value of clock variation. This effect is usually quite small.

is uniform since every starting time has an equal chance of occurring. As in the clock variation, the acceleration variation due to this event start variation is quite random so it is not included in the calibration set calculation. It is included in the validation set calculation in a way similar to the case of the clock variation.

Remark #5: The variability due to analogue to digital conversion, integer math calculations, etc. should be included in the software model of the sensing algorithm which mimics the calculation behavior of the circuit board on the SDM. These effects are not included in either the calibration set or validation set calculations.

Combining Variation Sources to Generate the Calibration Set

After identifying variation sources of the signal of a particular accelerometer it is necessary to combine the TABLE 1d

| # | Variation Type | 6σ variation | 6σ acceleration variation | Comments |
|---|---|---|---|---|
| | | Processing variation | | |
| 4.1 | Asynchornicity (TO effect) | 1 Δt (start time variation) | Not a linear function of source variation. See Remark #4 | Not included in calibration set calculation but included in validation set generation |
| 4.2 | A/D conversion | 1 lsb (least significant bit) = 0.25 G | Not a linear function of source variations. See Remark #5 | Must be included during algorithm validation. |
| 4.3 | Clipping | Varies | | Not part of the Variation Manger. |
| 4.4 | Integer math calculations | Varies | | |

Remark #4: In an actual vehicle the exact time when an acceleration signal due to a crash event will begin is a random occurrence. Therefore, the points at which the signal is sampled may be shifted by as much as one half of the time interval between samples. The distribution of this variation variations from the respective sources with the actual or simulated acceleration signal-time history for a selected crash event to generate a set of acceleration curves with variation that can be used to calibrate the sensing algorithm.

Figure 3:
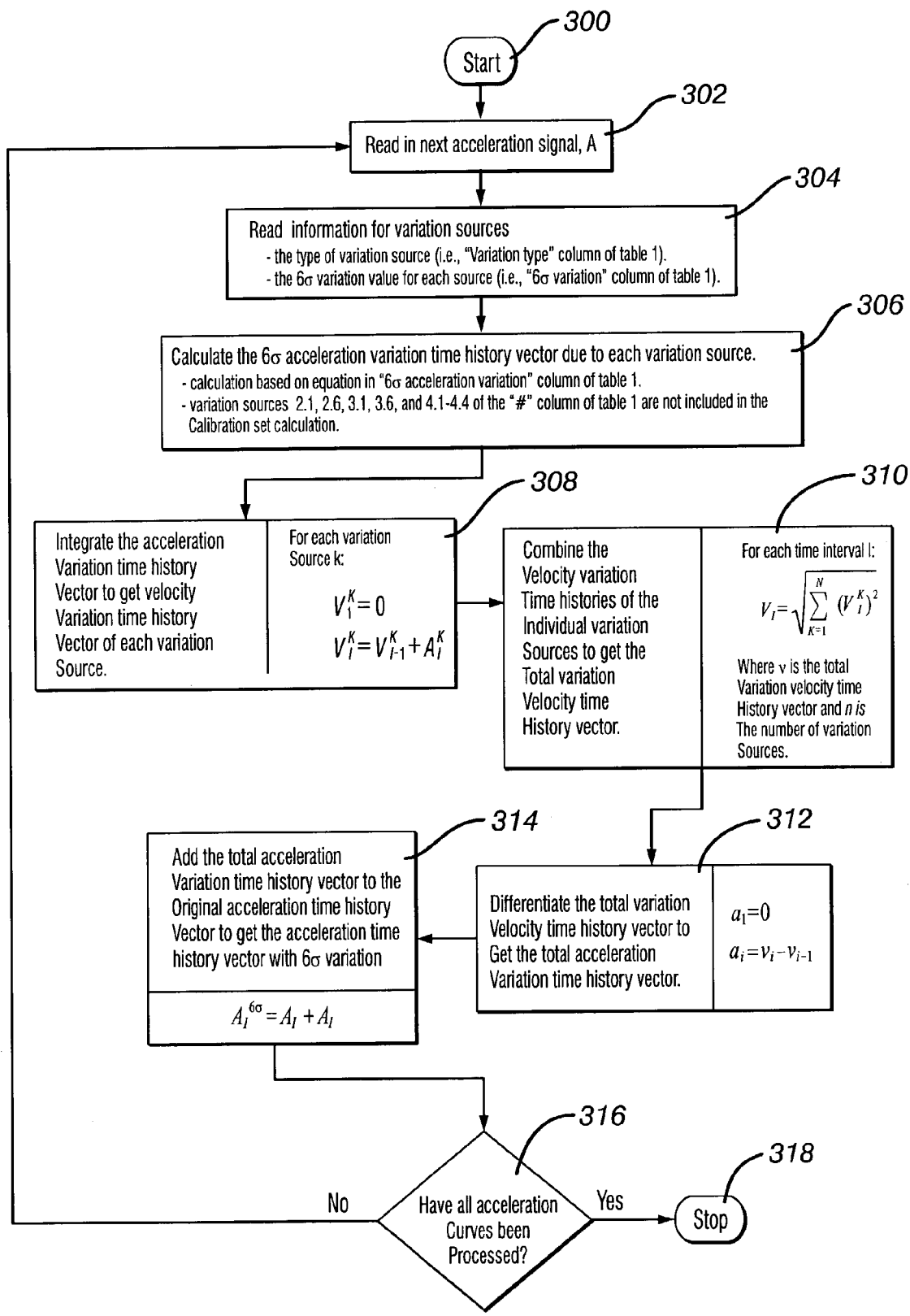
FIG. 3 is a flow chart of a preferred process to create acceleration variation calibration envelopes used for crash algorithm calibration.

Combining the effects of the different types of variation sources to give a single acceleration signal that includes the total variation is a multi-step process, which is described in detail in the flowchart shown in FIG. 3. In order explain this process more clearly an example will be given where the 6σ variations of three sources are combined to give the "6σ" acceleration-time history.

The process of FIG. 3 is suitably executed on a computer. The process starts at oval box 300 and proceeds by reading in an acceleration signal, box 302. The process then proceeds to box 304 in which information concerning the sources of variation and their magnitude is read from a suitable database. Box 304 refers to Table 1 for illustrations of the type of variation source. In this specification Table 1 is presented as Tables 1a–1d to better associate the remarks with the relevant portion of the table. In this example information concerning identified variation sources is found in the "Variation Type" column of Tables 1a–1d and corresponding values for each such variation are found in the columns headed as "6σ variation."

Having read in information concerning the variation sources to be considered the process proceeds to box 306 in which the acceleration variation-time history vector is calculated for each variation source. Again the reference to Table 1 in FIG. 3 is to be understood as referring to tables 1a–1d as appropriate. As indicated in box 306 not all of the variation sources listed in Tables 1a–1d are used to generate the calibration set, although they are all used to generate the validation set as described later. Calculations of the 6σ acceleration variation time history vectors used data in the "6σ acceleration variation" column of Tables 1a–1d. An illustration of the selection of variation sources, box 304, and the calculation of 6σ acceleration time history vectors, box 306, follows.

The first type of variation source that will be included in this example is the previously mentioned accelerometer sensitivity which appears in Table 1b as variation source 2.4 for the SDM sensor. In the table the 6σ variation is shown as 8% which was provided by the accelerometer supplier. The column labeled "6σ acceleration variation" in Tables 1a–1d gives the acceleration variation as a function of the source variation value, where $a_x(t)$ is the original, baseline, longitudinal acceleration time history signal.

The second variation source type included in the example is the accelerometer zero offset which appears in Table 1b as variation source 2.5 for the SDM sensor. When the accelerometer leaves the factory it is calibrated such that it will output zero volts when experiencing zero acceleration. However, this calibration may drift over time so that zero acceleration may result in a small output voltage from the accelerometer. Although the accelerometer sensor includes circuitry for zero-offset adjustment during its operation, it is still possible for it to be slightly in error. The maximum value of this error depends on the method used to store the acceleration values in digital form. For example, if due to memory constraints, the acceleration is stored as an 8-bit number, then there would be only $2^8$, or 256, possible values that could be stored. If the accelerometer is calibrated to have minimum and maximum values of ±50 G's, then the resolution of the acceleration values would be (50 G–(–50 G))/256, or about 0.4 G's. Therefore, any accelerometer value between –0.2 G's and +0.2 G's would be stored as 0 G's. Thus, the zero offset error could be as much as ±0.2 G's. (Note that is equivalent to ± one-half the acceleration value associated with the least significant bit used to store the acceleration.)

The third variation source type included in the example is the PCB (printed circuit board) misalignment relative to the vehicle (Table 1c, source 3.2). When the SDM is installed on the vehicle it is positioned so that the longitudinal axis of the accelerometer in the SDM coincides with the longitudinal axis of the vehicle. However, it is not possible to perfectly align these axes and it has been estimated that the 6σ value of the misalignment is about 5 degrees, or 0.087 radians. The effect of this misalignment is that the longitudinal acceleration reported by the accelerometer will be given by $$a_x^r = a_x^v + \sin(0.087)a_y^v - [1-\cos(0.087)]a_x^v$$

where $a_x^r$ is the longitudinal acceleration reported by the misaligned accelerometer and $a_x^v$ and $a_y^v$ are the longitudinal and lateral accelerations of the vehicle, respectively. Thus, the variation due to the misalignment is then given by $$a_x^r - a_x^v = \sin(0.087)a_y^v - [1-\cos(0.087)]a_x^v.$$

For small values of θ, sin(θ)≈θ, so the variation can be approximated by $$a_x^r - a_x^v \approx 0.087 a_y^v - [1-\cos(0.087)]a_x^v.$$

Figure 4:
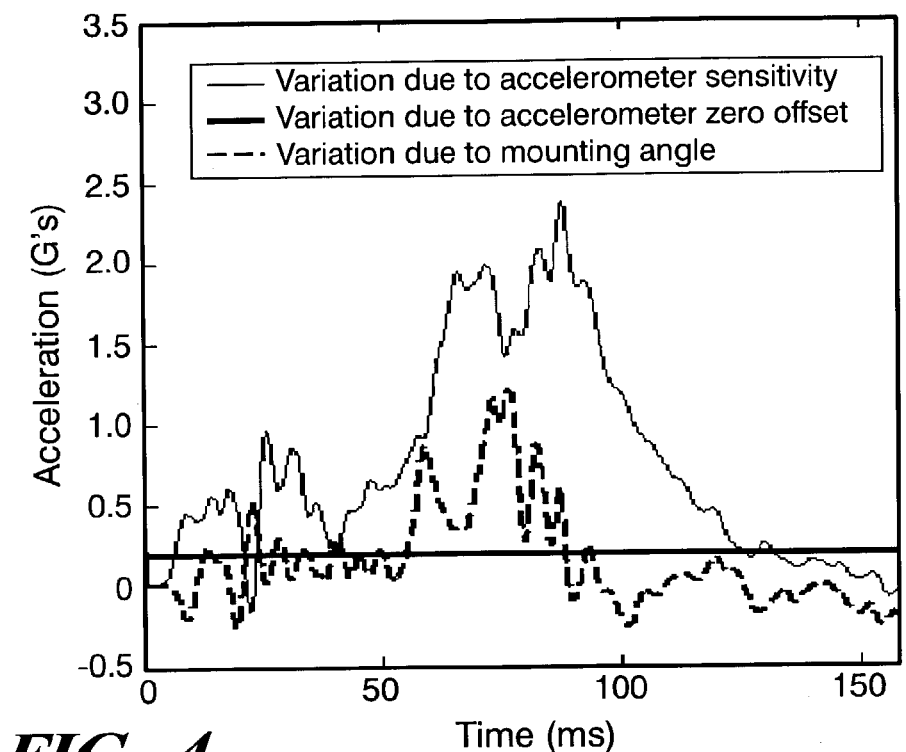
FIG. 4 is a graph of acceleration $6\sigma$ variations (in g) due to three specific source variations: accelerometer sensitivity, accelerometer zero offset, and accelerometer mounting angle. The values shown have been filtered at 200 Hz.

The 6σ variation of the acceleration has now been determined for the three variation sources that are being considered in this example (Box 306 in FIG. 3). The original acceleration signal used in this example is shown in FIG. 2A, while the acceleration variations due to the three variation sources are shown in FIG. 4.

The FIG. 3 process proceeds to box 308. This step is to integrate the acceleration variation time histories to give velocity variation time histories. The calculation is accomplished using the equations in box 308.

Figure 5:
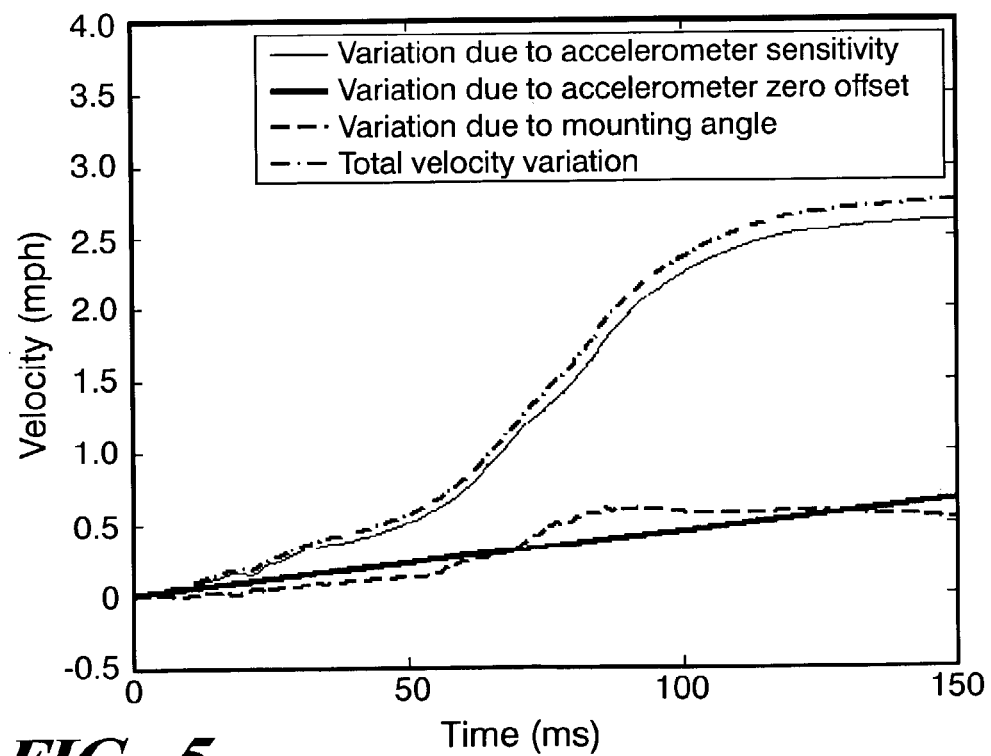
FIG. 5 is a graph of $6\sigma$ velocity signal variations due to the three source variations of FIG. 4 and the combined velocity variation.

Since many sensing algorithms use velocity-time histories for deployment decisions, it is important to have good approximations for the variation of the velocity time histories. In these cases, it may be preferred to combine the variations in velocity rather than in acceleration. Once the velocity variations due to each variation source are calculated, they are combined by the equation shown in Box 310 of FIG. 3. The resulting total velocity-time history variation curves over 150 ms of crash duration for this example are shown in FIG. 5 along with the velocity variations due to each source.

Figure 6:
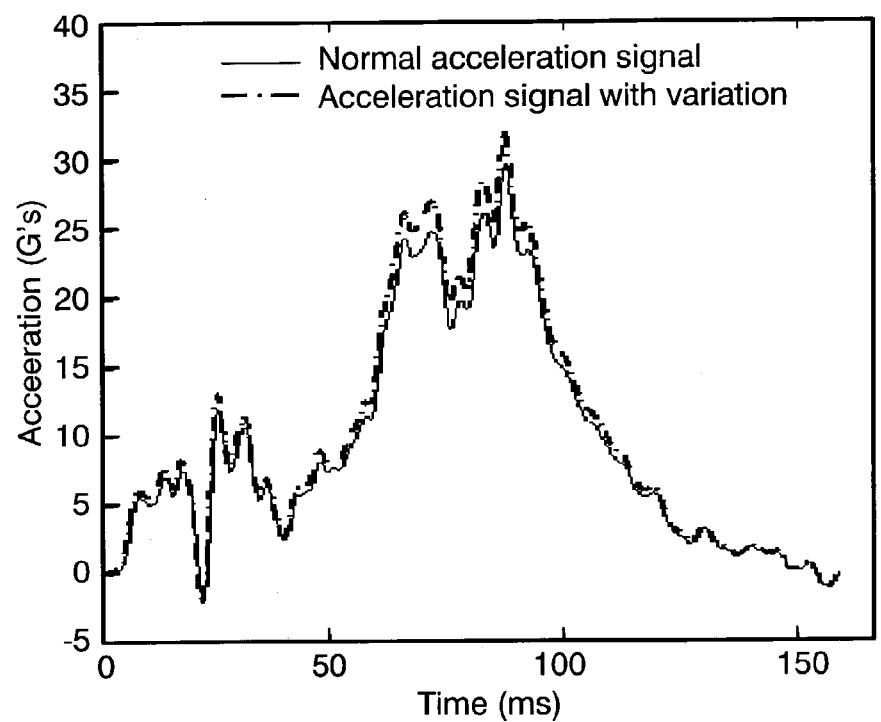
FIG. 6 is a graph of normal acceleration signals (g) with time (ms) and the corresponding signal with $6\sigma$ variation included.

Next, the process proceeds to box 312 where the total velocity-time history variation is differentiated to give the total acceleration time history variation. The equations shown in box 312 are used. This total acceleration variation is then added to the original baseline acceleration, box 314 to give the acceleration time history with "6σ" variation. The equation in box 314 shows the addition. FIG. 6 shows a curve of original acceleration signals for a crash event with the corresponding curve of total "6σ" variation, which was calculated as described above for each acceleration signal.

The process proceeds to query box 316 in which it is determined whether all acceleration curves have been processed. If "no" the process cycles back to box 302. If yes, the process is completed, oval box 318. These acceleration time history vectors with 6σ variation (or other selected variation) are used as a variation calibration set in calibration of a crash sensing algorithm.

It should be noted that the acceleration variation due to some source variations (such as the clock variation, #2.6 in Table 1b) is not a linear function of the value of the source variation. Because of this, the variation of the acceleration due to this type of variation source would not necessarily have a normal distribution, even though the source variation had such a distribution. In such a case, the method described in this embodiment to combine the variations (box 310 of FIG. 3) would not be appropriate. Therefore, this type of variation was not included in this example when calculating the total velocity-time history variation in the process to create the calibration set.

Because not all of the source variations were included in the exemplary calculation of the 6σ variation of the acceleration signals, they are only an approximation of the true 6σ acceleration time history variations. For this reason a second function of the variation manager may be used which creates a large population of acceleration signals that include the variations from all known sources. Once an algorithm has been calibrated so that it works correctly for the calibration set, this large population can be used to determine how well the algorithm will actually work after the variation is included in a large number of events.

Using the Variation Manager to Test an Algorithm

A large set of acceleration (with variation) signals is generated by first creating large populations of variation values for each variation source. A single value is selected at random from the large population of variation values for the first variation source. This value is used to generate an acceleration variation-time history for this variation source based on the information or formula given in the "6σ acceleration variation" column of Tables 1a–1d. This acceleration variation-time history from the first variation source is then added to the original acceleration signal. Finally, this process is repeated for all variation sources to give a crash event signal with random variation from all variation sources. This is then repeated numerous times until a large population of signals has been generated. The details of this procedure are shown in the flowchart in FIG. 7.

An example will be given to more clearly explain the process described in FIG. 7. For this example, only variation sources 1.1, 2.2, 2.3, 2.4, 2.5, 2.6 and 4.1 from Tables 1a, 1b and 1d will all be included.

The process starts at oval box 700 and proceeds to read in an acceleration signals, process box 702. The process proceeds to box 704 where information pertaining to the variation source (as illustrated in the above paragraph) and the 6σ variation value for each source are obtained or read. In this example information is obtained from the "Variation Type" and "6 σ variation" columns of Tables 1a–1d. Again, box 704 refers to "Table 1" which means Tables 1a–1d in the specification.

The process proceeds to box 706 where the 6σ acceleration time history vector due to each selected variation source is calculated. Note that not all of the possible variation sources identified in tables 1a–1d are included in the example of a variation set calculation.

Figure 7:
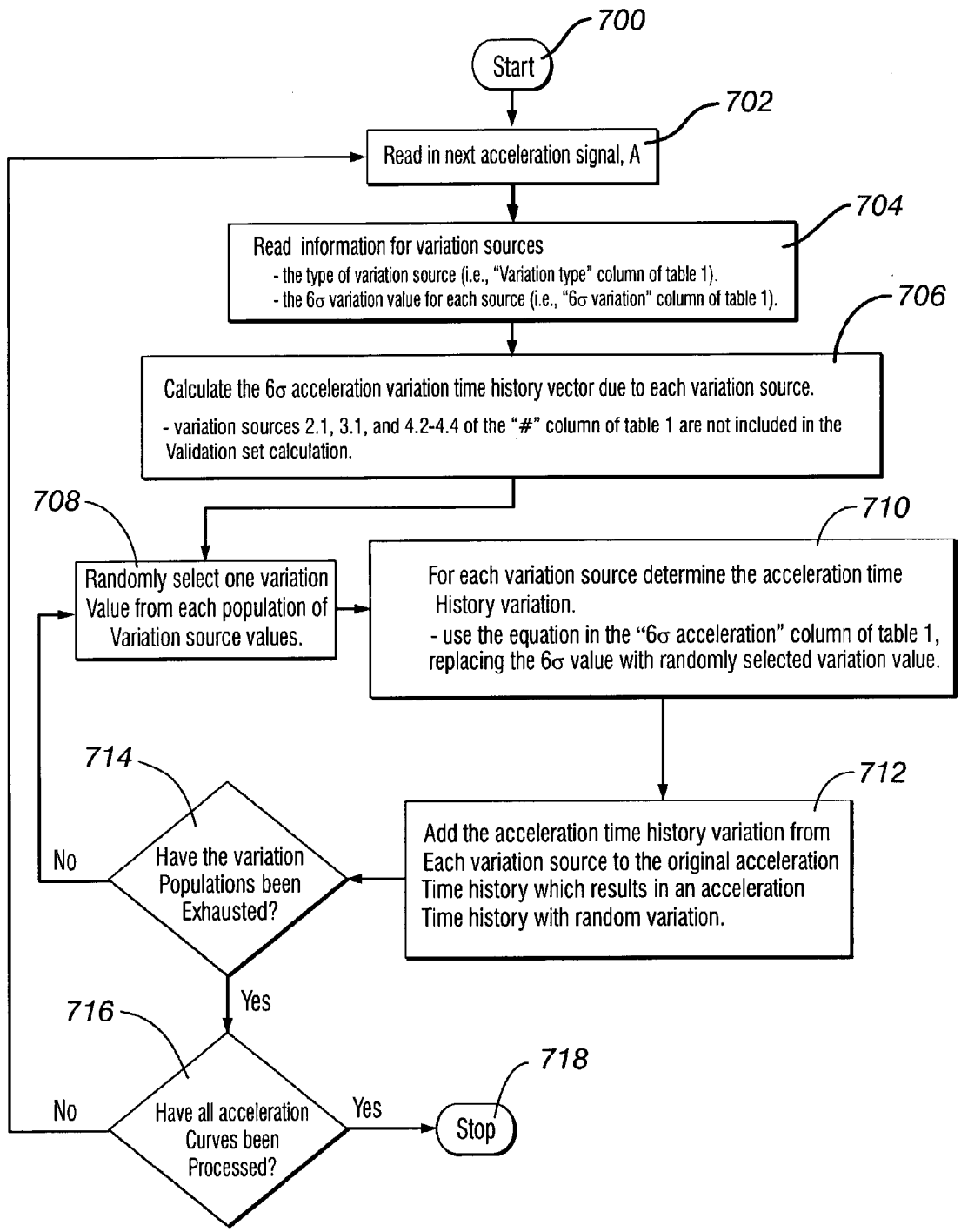
FIG. 7 is a flow chart of a process to create acceleration signals with random variation for use in algorithm validation.

The next step is to select a variation value for each source from the large population of values that have been generated for each variation source (Box 708 in FIG. 7). For example, a random distribution of accelerometer sensitivity values (Variation Type 2.4) is created with a mean value of 0.0 and a standard deviation, σ, of 1.333%, and then one value from this population is selected at random. In this example this random selection resulted in a value of 2.36%, as shown in Table 2, inserted below. Note that for variation source 4.1 a variation is selected from a uniform distribution for the reason described in Remark #4 with Table 1d. The randomly selected values of the variations are shown in table 2.

Figure 8:
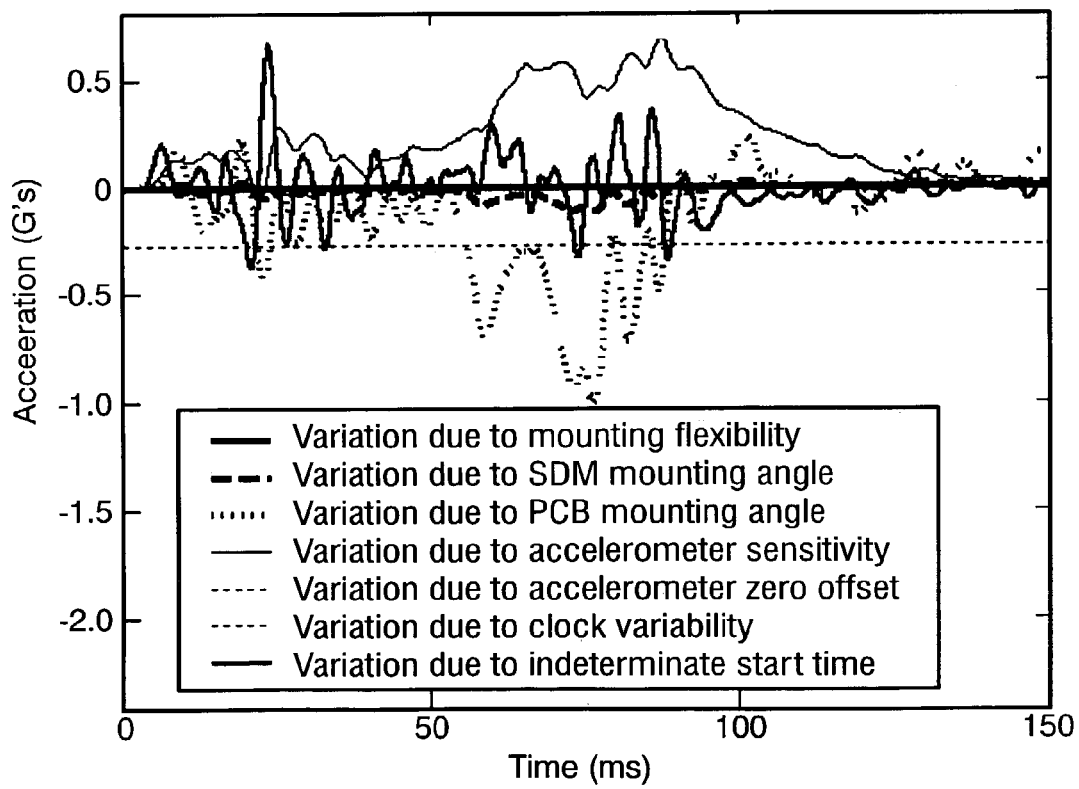
FIG. 8 is a graph of computer generated random acceleration variations (g), due to several indicated sources, with time (ms).

The next step is to calculate the acceleration variation due to each source (Box 710) by the method described in the "6σ acceleration variation" column of Tables 1a–1d, except, of course, that the 6σ variation for each source will be replaced by the actual variations shown in Table 2. The resulting acceleration variations over 150 ms crash duration due to each source are shown in FIG. 8. Next, these variations are all added to the original acceleration signal to give an acceleration signal with random variation (Box 712).

TABLE 2

A Case Study: Crash Sensing System Variations

| # | Variation type | 6σ variation | Randomly selected variation |
|---|---|---|---|
| | Vehicle variation | | |
| 1.1 | Sensor mounting structure flexibility (SDM) | $6\sigma_{1.1}$ = 0.4% @ 400 Hz | 0.02372%. |
| | SDM sensor variation | | |
| 2.2 | Pcb misalignment (vs. vehicle) | $6\sigma_{2.2}$ = 0.087 radians | −0.00831 radians |
| 2.3 | Accelerometer misalignment (vs. Pcb) | $6\sigma_{2.3}$ = 0.087 radians | −0.07241 radians |
| 2.4 | Accelerometer sensitivity | $6\sigma_{2.4}$ = 8% = 0.08 | 2.36% |
| 2.5 | Accelerometer zero offset | $6\sigma_{2.5}$ = 11 mV = 0.2 G | −0.267 G's |
| 2.6 | Clock variability | $6\sigma_{2.6}$ < 0.1% | 0.07% |
| 4.1 | Asynchronicity (T0 effect) | 1 Δt (start time variation) | 0.9501 Δt |

Often there is very little difference between the nominal acceleration and the acceleration that includes one set of random variations. It will usually be the case that the total variation that is added to the acceleration signal will be small, since for most of the variation sources the random variations are selected from a normally distributed population of variations with a mean of 0. However, if a large number of these signals with variation are constructed, there will certainly be a few with relatively large variation on the order of the variation seen in calibration set shown in FIGS. 5 and 6, and, perhaps, even exceeding those variations. For this reason it is important to construct a large number of these signals that include random variation so that they can be used as a validation set to test the performance of candidate sensing algorithms.

Accordingly, after an acceleration time history variation has been calculated the process proceeds to query box 714 to determine if the all values of the variation population have been used to create an acceleration time history value. If not the process cycles through boxes 708, 710, 712 and 714 until this has been accomplished. Once the population of acceleration time histories for a given acceleration curve have been calculated and stored, the process proceeds to query box 716 where it is considered whether all acceleration curves for the respective sensor locations and crash situations have been determined. If "no" the process cycles through boxes 702–716 until the answer is "yes" and the process stops, box 718.

Thus, a process has been devised for identifying and quantifying sources of variation at a predetermined σ level in vehicle accelerometer signals. Further, process steps have been illustrated for combining either the sigma level values, or random values within these levels, with acceleration-time histories for the purpose of calibrating and/or validating proposed crash evaluation algorithms. While these practices have been illustrated and described in terms of certain specific embodiments it is apparent that other embodiments could readily be adapted by one skilled in the art. Accordingly, the scope of the invention is limited only by the following claims.

The invention claimed is:

1. A method of determining variation in acceleration-time history values from an acceleration sensor located on a vehicle body where such values are to be used in a candidate algorithm for on-vehicle sensing of a crash event, said method comprising identifying sources contributing to variation in said acceleration values and determining acceleration variation values at a predetermined sigma (σ) level for each of said sources;

preparing an acceleration variation-time vector history for each of said identified variation sources;

integrating each of said acceleration variation-time vector histories to produce a velocity variation-time history vector corresponding to each of said acceleration variation vectors;

combining said velocity variation-time history vectors by a sum of the squares method to produce a velocity variation-time history vector representing the total variation in velocity attributable to said sources;

differentiating said total velocity variation-time history vector to produce a total acceleration variation-time history vector;

adding said total acceleration variation vector to said acceleration-time history to produce said acceleration plus/minus variation-time history; and using said variation values in combination with said acceleration-time history values as an acceleration plus/minus variation-time history in calibration or validation of said algorithm.

2. A method as recited in claim 1 comprising integrating said acceleration plus/minus variation-time history to produce a velocity plus/minus variation-time history.

3. A method as recited in claim 2 comprising integrating said velocity plus/minus-time history to produce a displacement plus/minus variation-time history.

4. A method as recited in claim 3 comprising using said displacement plus/minus variation-time history to set a threshold value for displacement in said candidate algorithm.

5. A method as recited in claim 2 comprising using said velocity plus/minus variation-time history to set a threshold value for velocity in said candidate algorithm.

6. A method as recited in claim 1 comprising using said acceleration plus/minus variation-time history to set a threshold value for acceleration in said candidate algorithm.

7. A method as recited in claim 1 comprising preparing an acceleration-time history for said sensor in a simulated crash event creating a randomly distributed population of acceleration variation values for each of said identified variation sources for said sensor, randomly selecting one variation value from each population of variation source values, determining the acceleration variation-time history using said random variation value for each source;

adding the acceleration variation-time history for each variation source to said acceleration-time history to produce an acceleration-time history with random variation, repeatedly determining said acceleration-time histories with random variations using the acceleration variation values of said randomly distributed population for each said variation source, and using said acceleration time histories with random variation in validation testing of said algorithm.

8. A method as recited in claim 7 in which number of said acceleration time histories with random variation used in said validation testing exceeds one hundred thousand.

9. A method for calibration or validation of a candidate algorithm for on-vehicle sensing of a crash event where the candidate algorithm uses acceleration-time history values from at least one acceleration sensor located on a vehicle body, said method comprising identifying at least two sources contributing to variation in the acceleration values obtained from each acceleration sensor, where variation is the difference between the value of acceleration reported by the sensor and the acceleration that it experiences, and determining acceleration variation values at a predetermined sigma (σ) level for each of said sources, preparing an acceleration variation-time vector history for each of said identified variation sources;

integrating each of said acceleration variation-time vector histories to produce a velocity variation-time history vector corresponding to each of said acceleration variation vectors;

combining said velocity variation-time history vectors by a sum of the squares method to produce a velocity variation-time history vector for each acceleration sensor representing the total variation in velocity attributable to said sources;

differentiating said total velocity variation-time history vector to produce a total acceleration variation-time history vector for each acceleration sensor;

adding said total acceleration variation vector to said acceleration-time history to produce said acceleration plus/minus variation-time history for each acceleration sensor; and using said variation values in combination with said acceleration-time history values for each acceleration sensor as an acceleration plus/minus variation-time history for each acceleration sensor in calibration or validation of said algorithm.

10. A method as recited in claim 9 comprising preparing an acceleration-time history for each said sensor in a simulated crash event creating a randomly distributed population of acceleration variation values for each of said identified variation sources for each said sensor, randomly selecting one variation value from each population of variation source values, determining the acceleration variation-time history for each acceleration sensor using said random variation value for each source;

adding the acceleration variation-time history for each variation source to said acceleration-time history to produce an acceleration-time history with random variation for each acceleration sensor, repeatedly determining said acceleration-time histories with random variations using the acceleration variation values of said randomly distributed population for each said variation source, and using said acceleration time histories with random variation for each acceleration sensor in validation testing of said algorithm.

11. A method as recited in claim 10 in which number of said acceleration time histories with random variation used in said validation testing exceeds one hundred thousand.

* * * * *